United States Patent
Mannengal et al.

(10) Patent No.: US 12,184,646 B2
(45) Date of Patent: Dec. 31, 2024

(54) NETWORKED DEVICE SECURITY POSTURE MANAGEMENT

(71) Applicant: Microsoft Technology Licensing, LLC, Redmond, WA (US)

(72) Inventors: Arun Mannengal, Sammamish, WA (US); Chandra Sekhar Surapaneni, Sammamish, WA (US); Rajesh Kumaraswamy, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/743,020

(22) Filed: May 12, 2022

(65) Prior Publication Data
US 2023/0370452 A1 Nov. 16, 2023

(51) Int. Cl.
*H04L 9/40* (2022.01)
*H04L 41/12* (2022.01)

(52) U.S. Cl.
CPC .......... *H04L 63/0876* (2013.01); *H04L 41/12* (2013.01); *H04L 63/1433* (2013.01); *H04L 63/20* (2013.01)

(58) Field of Classification Search
CPC ....... H04L 41/12; H04L 41/145; H04L 43/04; H04L 43/0811; H04L 63/1433
See application file for complete search history.

(56) References Cited

U.S. PATENT DOCUMENTS

| 2005/0198216 A1* | 9/2005 | Behera ............... H04L 41/12 709/224 |
| 2007/0094716 A1* | 4/2007 | Farino ............... H04L 63/101 726/5 |
| 2009/0199294 A1* | 8/2009 | Schneider ............ G06F 21/316 726/18 |

(Continued)

FOREIGN PATENT DOCUMENTS

| CN | 109857917 B | 7/2021 |
| CN | 114077811 A | 2/2022 |

OTHER PUBLICATIONS

"Microsoft Secure Score for Devices", retrieved from « https://docs.microsoft.com/en-us/microsoft-365/security/defender-endpoint/tvm-microsoft-secure-score-devices?view=o365-worldwide», Mar. 28, 2022, 5 pages.

(Continued)

*Primary Examiner* — Fadi Haj Said
(74) *Attorney, Agent, or Firm* — Ogilvie Law Firm

(57) ABSTRACT

Networked device management is based on an ontology graph which includes device nodes, physical facility nodes, and edges. The ontology graph may go beyond network topology by also documenting: relationships between devices and facilities, facility attributes such as facility-specific security scores, and device characteristics such as whether a device is recognized, whether it is authorized, and its mission criticality. Medical devices, physical condition sensors, and other internet of things devices, including those embedded in vehicles, those located on a vehicle, those used (Continued)

for industrial control, or those which are intermittently air-gapped, are managed. Devices may be discovered by extraction of identifications and characteristics from telemetry data in a staged architecture. Security postures may be assessed, and security recommendations based on device context may be provided.

20 Claims, 5 Drawing Sheets

(56) References Cited

U.S. PATENT DOCUMENTS

| | | | | |
|---|---|---|---|---|
| 2011/0219452 | A1* | 9/2011 | Porter | H04L 63/1425 726/23 |
| 2014/0279747 | A1* | 9/2014 | Strassner | H04L 41/085 706/12 |
| 2016/0088006 | A1* | 3/2016 | Gupta | H04L 41/149 706/12 |
| 2017/0041360 | A1* | 2/2017 | Wallace | H04W 4/80 |
| 2017/0289187 | A1 | 10/2017 | Noel et al. | |
| 2018/0159876 | A1* | 6/2018 | Park | H04L 63/1425 |
| 2018/0183827 | A1* | 6/2018 | Zorlular | H04L 63/1416 |
| 2018/0278687 | A1 | 9/2018 | Handa et al. | |
| 2018/0349920 | A1 | 12/2018 | Katib et al. | |
| 2019/0035242 | A1* | 1/2019 | Vazirani | G08B 13/19695 |
| 2019/0132323 | A1* | 5/2019 | Williams | H04L 63/083 |
| 2019/0182711 | A1* | 6/2019 | Senju | H04L 45/64 |
| 2020/0137141 | A1 | 4/2020 | Mannengal et al. | |
| 2020/0143052 | A1 | 5/2020 | Mazumder et al. | |
| 2020/0327223 | A1* | 10/2020 | Sanchez | G06F 21/554 |
| 2020/0341947 | A1* | 10/2020 | Aziz | G06F 16/1774 |
| 2020/0358804 | A1 | 11/2020 | Crabtree et al. | |
| 2021/0004878 | A1* | 1/2021 | Hogg | G06F 16/9537 |
| 2021/0034357 | A1 | 2/2021 | Kesavan et al. | |
| 2021/0136076 | A1 | 5/2021 | Barhudarian et al. | |
| 2021/0185146 | A1 | 6/2021 | Mannengal et al. | |
| 2021/0218770 | A1* | 7/2021 | Ben-Yosef | G06F 21/554 |
| 2021/0389968 | A1* | 12/2021 | Majewski | G06F 9/5072 |
| 2022/0108806 | A1 | 4/2022 | Kommalapati et al. | |
| 2022/0147839 | A1* | 5/2022 | Macedo | G06F 16/287 |
| 2022/0217156 | A1* | 7/2022 | Wahbo | G06N 3/045 |
| 2022/0303787 | A1* | 9/2022 | Pratt | H04W 64/00 |

OTHER PUBLICATIONS

"Semantic network", retrieved from «https://en.wikipedia.org/wiki/Semantic_network», Feb. 26, 2022, 8 pages.

"Industrial control system", retrieved from «https://en.wikipedia.org/wiki/Industrial_control_system», Feb. 9, 2022, 7 pages.

"MindSphere: Industrial IoT as a service", retrieved from «https://siemens.mindsphere.io/en», no later than Apr. 18, 2022, 7 pages.

"Connectivity", retrieved from «https://siemens.mindsphere.io/en/docs/connectivity», no later than Apr. 18, 2022, 6 pages.

Peter G. Martin, "Managing geographically distributed industrial assets", retrieved from «https://download.schneider-electric.com/files?p_enDocType=White+Paper&p_File_Name=ID%23146_998-19681883_GMA-US_A.pdf&p_Doc_Ref=PAS_63680_CPM16004», 2016, 9 pages.

"Microsoft Defender for IoT", retrieved from «https://azure.microsoft.com/en-us/services/iot-defender/#overview », no later than Apr. 18, 2022, 14 pages.

"Scenrio", retrieved from «https://senr.io/products.html», no later than Apr. 18, 2022, 10 pages.

"What is security posture?", retrieved from « https://www.balbix.com/insights/what-is-cyber-security-posture/», no later than Apr. 18, 2022, 16 pages.

"Fortinet Fortigate Firewall", retrieved from « https://www.sawmill.net/formats/forti_gate.html», no later than Apr. 18, 2022, 3 pages.

Jonatan Meczyk, "IoT Asset discovery based on FW logs", retrieved from « https://techcommunity.microsoft.com/t5/microsoft-sentinel-blog/iot-asset-discovery-based-on-fw-logs/ba-p/2232851», Apr. 4, 2021, 3 pages.

"Manage assets end-to-end with ITIL-aligned IT Asset Management Software", retrieved from «https://freshservice.com/asset-management-software?tactic_id=5117871», no later than Apr. 18, 2022, 12 pages.

Fred Holahan, "Announcing Edge2Web Flow Server!", retrieved from »https://edge2web.com/2019/10/15/announcing-edge2web-flow-server/«, Oct. 15, 2019, 4 pages.

"MindSphere Architecture", retrieved from «https://documentation.mindsphere.io/MindSphere/concepts/concept-architecture.html», no later than Apr. 18, 2022, 4 pages.

"Non Final Office Action Issued in U.S. Appl. No. 17/742,979", Mailed Date: Dec. 9, 2022, 47 Pages.

"Final Office Action Issued in U.S. Appl. No. 17/742,979", Mailed Date: Mar. 24, 2023, 60 Pages.

"International Search Report and Written Opinion issued in PCT Application No. PCT/US23/018099", Mailed Date: Jul. 6, 2023, 13 Pages.

"Non-Final Office Action Issued in U.S. Appl. No. 17/742,979", Mailed Date: Jun. 22, 2023, 36 Pages.

"International Search Report and Written Opinion Issued in PCT Application No. PCT/US23/018098", Mailed Date: Jul. 17, 2023, 14 Pages.

* cited by examiner

NETWORKED DEVICE SECURITY POSTURE MANAGEMENT

BACKGROUND

A wide variety of devices may be connected by a network. Some devices include computing hardware, which may be controlled by firmware or other software. Some devices include physical condition sensors, to sense temperature, humidity, acceleration, pressure, position, or other physical conditions. Some devices include a display screen, while others do not. Some devices can only transmit data over a network connection, while other devices can transmit data and also receive data. Some devices have a typical working life span of multiple years, while others cease to be reliable, or even to function at all, after a shorter time. Some devices are inexpensive, while others are not.

Efforts to manage networked devices also vary widely. Management may be directed at goals such as accuracy, convenience, coverage, economy, efficiency, flexibility, portability, reliability, or security, for example. Improvements in networked device management are possible with respect to various goals.

SUMMARY

Some embodiments described herein address technical challenges related to networked device management, such as how to formulate device-specific management recommendations, as opposed to more general recommendations that do not apply as well to the specific device and its circumstances. Some embodiments manage networked devices based on relationships between specific devices and specific physical facilities, e.g., based on facility-specific security scores.

Some embodiments construct, update, or utilize an ontology graph as a basis for networked device management. The ontology graph has device nodes, facility nodes, and edges. Each edge between a device node and a facility node represents a relationship between a corresponding device and a physical facility. Each edge between two device nodes represents a network communication between the corresponding devices.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
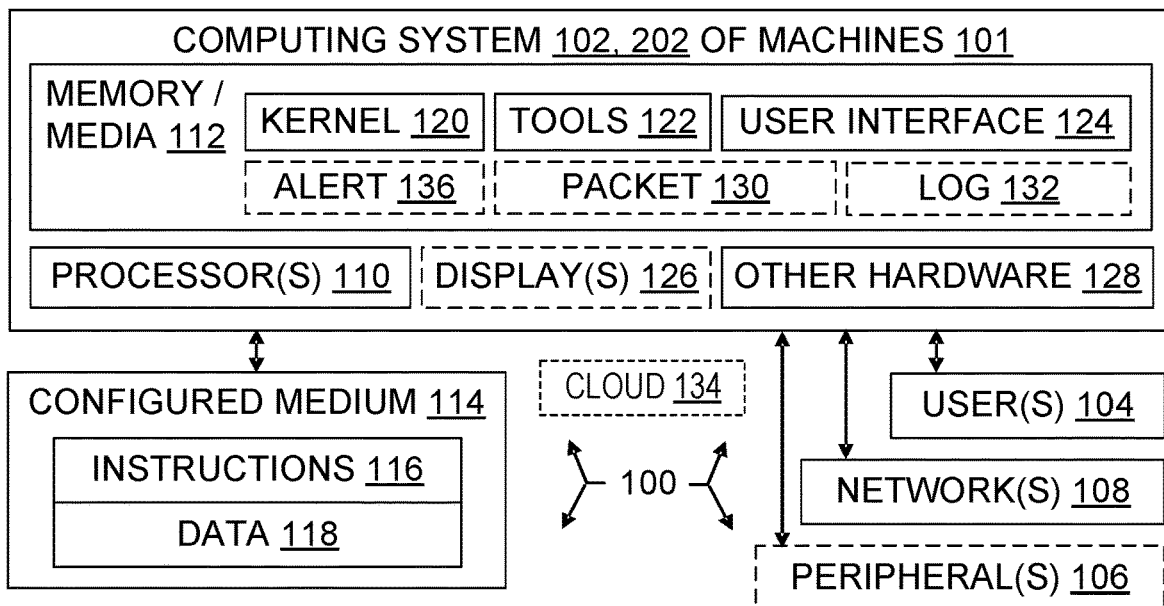
FIG. 1 is a diagram illustrating aspects of computer systems and also illustrating configured storage media.

Innovations may expand beyond their origins, but understanding an innovation's origins can help one more fully appreciate the innovation. In the present case, some teachings described herein were motivated by technical challenges arising from ongoing efforts by Microsoft innovators to help manage internet of things (IoT) devices, e.g., industrial control system (ICS) devices. However, the teachings presented here may also be applied beneficially to other networked devices such as smartphones, tablets, laptops, workstations, production servers, other servers, network security devices.

Microsoft innovators explored various ways to accurately and efficiently determine what internet of things devices were on a network in various situations, and to assess the security of those devices and the security of their networks. The innovators recognized that rapid growth in the number of internet of things devices, and greater variation in how these devices are deployed, each posed significant technical challenges to device inventory accuracy and to the security of devices and networks. The innovators determined that although certain approaches to networked device management may provide some help, they may also have some significant disadvantages. For example, some approaches fail to account for intermittent air-gapping, e.g., as when a ship bearing internet of things (IoT) devices brings those devices within internet connectivity range only when the ship is near land. Some approaches are specific to a particular internet of things vendor, and thus fail to account for devices from other vendors even when all of the devices are networked together. Some approaches fail to detect unauthorized devices. Some approaches are vulnerable to typographical errors. Some approaches fail to account for differences in device context, and some fail to account for differences in the importance of different devices, by treating all devices as equals from an inventory perspective or a security perspective.

In short, networked device management poses problems such as how to determine what devices are on a network, and how to assess the security of those devices and the security of the network. These problems may be refined into related technical challenges, such as: which procedures and data to use in order to accurately and efficiently discover which devices are present in a network over time, which procedures and data to use in order to identify any new devices or unauthorized devices among the devices that are present in the network, how to represent devices and networks as data structures, and which procedures and data to use in order to efficiently and effectively secure the devices and the network.

Some embodiments described herein address these challenges. For example, some embodiments discover networked devices by extracting device identifications and characteristics from telemetry data and then building or updating a corresponding ontology graph data structure. A staged telemetry forwarding architecture helps some embodiments take advantage of connectivity when it is available. Automated data extraction from telemetry reduces or avoids vulnerability to typographical errors, and is not limited to devices from a particular vendor. Tracking both the network topology and the device characteristics in the ontology graph supports treating a given device according to its own particular context and importance, e.g., when an embodiment is automatically formulating a security recommendation. Software configured to query available data sources, e.g., vendor-specific inventory lists and authenticated admin personnel, provides an effective mechanism in some embodiments to identify unauthorized devices that can then be treated as security threats. These and other benefits will be apparent to one of skill from the teachings provided herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, networked device management functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience, inclusion of an item in FIG. 1 does not imply that the item, or the described use of the item, was known prior to the current innovations.

More About Systems

Figure 2:
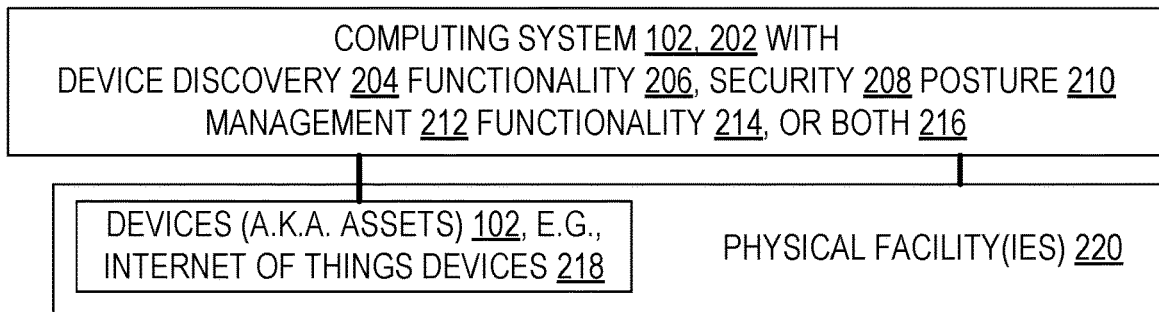
FIG. 2 is a diagram illustrating aspects of a computing system which has one or more of the networked device management enhancements taught herein.

FIG. 2 illustrates a computing system 102 configured by one or more of the networked device management enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
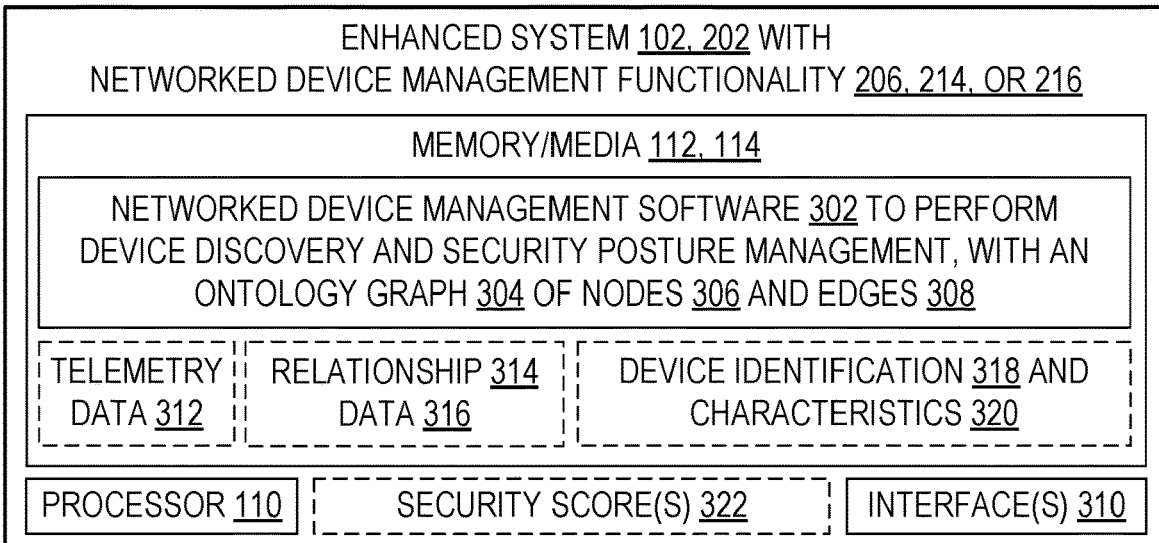
FIG. 3 is a block diagram illustrating an enhanced system configured with networked device management functionality.

FIG. 3 illustrates an enhanced system 202 which is configured with networked device management software 302 to provide functionality 206, 214, or 216. Software 302 and other FIG. 3 items are discussed at various points herein, and additional details regarding them are provided in the discussion of a List of Reference Numerals later in this disclosure document.

Figure 4:
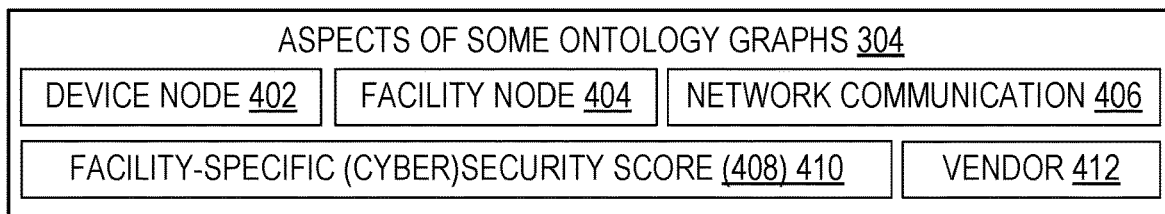
FIG. 4 is a block diagram illustrating aspects of some ontology graph data structures.

FIG. 4 shows aspects of some ontology graphs 304. This is not a comprehensive summary of all ontology graphs 304, or a comprehensive summary of all aspects of an environment 100 or system 202 or other context of an ontology graph, or a comprehensive summary of all ontology graph or other data structures or other mechanisms for potential use in or with a system 102 or 202. FIG. 4 items are discussed at various points herein, and additional details regarding them are provided in the discussion of a List of Reference Numerals later in this disclosure document.

Figure 5:
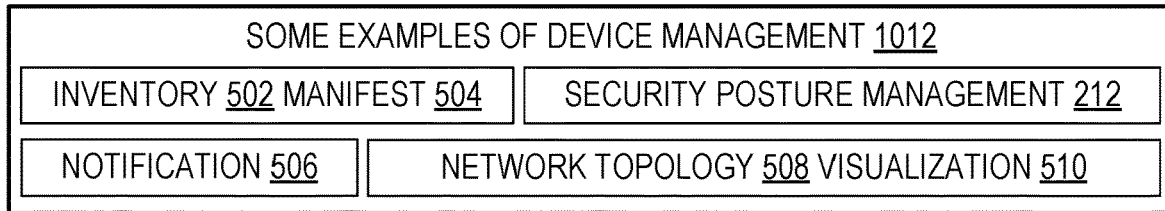
FIG. 5 is a block diagram illustrating some examples of networked device management.

FIG. 5 shows aspects of networked device management 212. This is not a comprehensive list of all aspects of networked device management. FIG. 5 items are discussed at various points herein, and additional details regarding them are provided in the discussion of a List of Reference Numerals later in this disclosure document.

Figure 6:
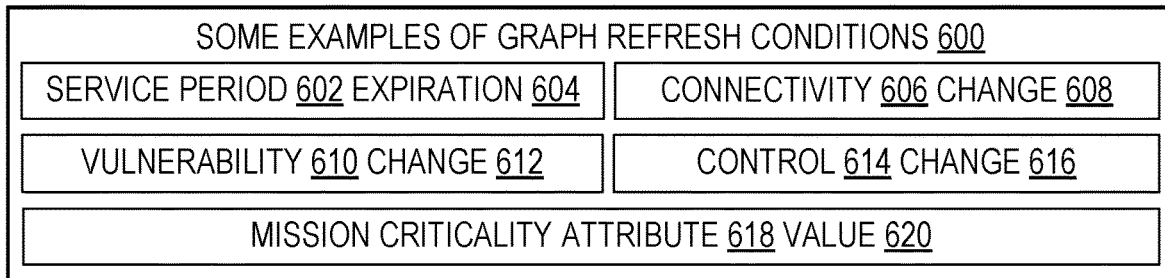
FIG. 6 is a block diagram illustrating some examples of ontology graph refresh conditions.

FIG. 6 shows examples of conditions 600 that may trigger a creation, update, or other refresh of an ontology graph 304. This is not a comprehensive list of all aspects of graph 304 refresh conditions. FIG. 6 items are discussed at various points herein, and additional details regarding them are provided in the discussion of a List of Reference Numerals later in this disclosure document.

Figure 7:
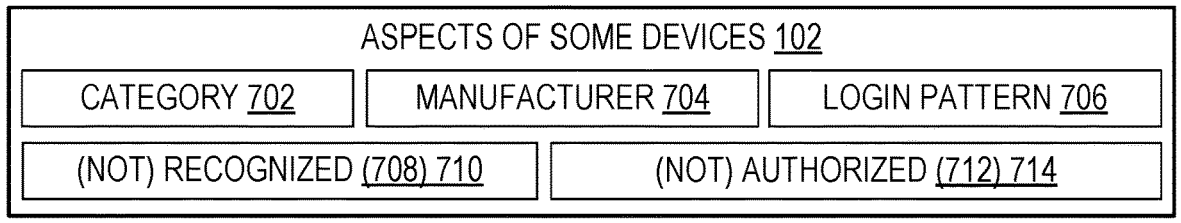
FIG. 7 is a block diagram illustrating aspects of some networked devices.

FIG. 7 shows some aspects of networked devices 102. This is not a comprehensive list of all aspects of networked devices. FIG. 7 items are discussed at various points herein, and additional details regarding them are provided in the discussion of a List of Reference Numerals later in this disclosure document.

Figure 8:
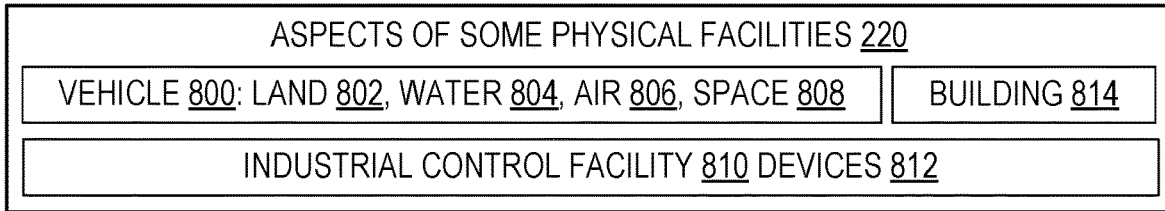
FIG. 8 is a block diagram illustrating aspects of some physical facilities that have relationships to networked devices.

FIG. 8 shows aspects of physical facilities 220. This is not a comprehensive list of all aspects of physical facilities or a list of all physical facilities that may be related to one or more networked devices 102. FIG. 8 items are discussed at various points herein, and additional details regarding them are provided in the discussion of a List of Reference Numerals later in this disclosure document.

Figure 9:
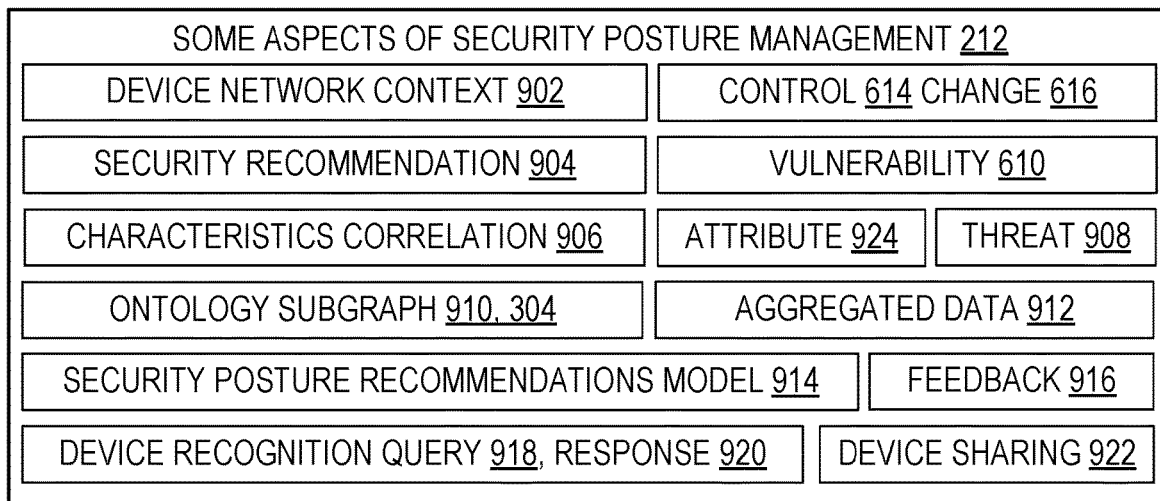
FIG. 9 is a block diagram illustrating some aspects of networked device security posture management.

FIG. 9 shows some aspects of networked device security posture management 212. This is not a comprehensive list of all aspects of networked device management. FIG. 9 items are discussed at various points herein, and additional details regarding them are provided in the discussion of a List of Reference Numerals later in this disclosure document.

In some embodiments, the enhanced system 202 may be networked through an interface 310. An interface 310 may include hardware such as network interface cards, software such as network stacks, APIs, or sockets, combination items such as network connections, or a combination thereof.

In some embodiments, an enhanced system 202 includes a computing system 202 which is configured to perform networked device discovery and management. The enhanced system 202 includes a digital memory 112 and a processor 110 in operable communication with the memory. In a given embodiment, the digital memory 112 may be volatile or nonvolatile or a mix.

In one example, the processor 110 is configured to perform networked device discovery and management steps, i.e., to execute networked device discovery and management. This includes (a) ingesting 1002 telemetry data 312 of devices 102, (b) obtaining 1004 relationship data 316 which specifies one or more relationships 314 between at least some of the devices 102 and one or more physical facilities 220, (c) extracting 1006 device identifications 318 and device characteristics 320 from the ingested telemetry data, (d) constructing 1008 or updating 1010 an ontology graph 304, the ontology graph having device nodes 402, facility nodes 404, and edges 308, each edge 308 between a device node 402 and a facility node 404 representing a relationship 314 between a corresponding device 102 and a physical facility 220, each edge 308 between two device nodes 402 representing a network communication 406 between the corresponding devices 102, and (e) managing 1012 at least one of the devices based on the ontology graph 304.

In the foregoing, items are labeled (a) through (e) for convenient reference only; the labeling is not meant to impose any chronological sequence. For instance, in some circumstances some relationship data involving a device is obtained 1004 before telemetry data involving that device is ingested 1002, while in other circumstances relationship data is obtained 1004 after telemetry data is ingested 1002; relationship data could also be obtained both before and after telemetry ingestion. Similarly, an ontology graph may sometimes be updated 1010 after an embodiment has begun managing 1012 a device represented in the ontology graph.

One of skill will acknowledge that many other variations in the order of steps 1002-1012 are also feasible in view of the teachings provided herein, as well as step repetition or concurrent execution of some steps, subject to feasibility constraints. One such feasibility constraint is that device identifications 318 and device characteristics 320 are not extracted 1006 from ingested telemetry data until after that telemetry data has been ingested 1002. Another feasibility constraint is that some telemetry data 312 will be ingested 1002, or some relationship data 316 will be obtained 1004, or both, before an ontology graph that includes such data 312 or 316 is constructed 1008.

In some embodiments, an enhanced system 202 includes a computing system 202 which is configured to perform networked device security posture management. The enhanced system 202 includes a digital memory 112 and a processor 110 in operable communication with the memory. In a given embodiment, the digital memory 112 may be volatile or nonvolatile or a mix.

In this example, the processor 110 is configured to perform networked device security posture management steps, i.e., to execute networked device security posture management. This includes (a) acquiring 1102 access 1104 to an ontology graph 304 which has device nodes 402, facility nodes 404, and edges 308, each edge 308 between a device node 402 and a facility node 404 representing a relationship 314 between a corresponding device 102 and a physical facility 220, each edge 308 between two device nodes 402 representing network communication 406 between the corresponding devices 102, and (b) managing 212 a security posture 210 of at least a one of the devices 102 based on the ontology graph 304.

The labels (a) and (b) in the preceding paragraph are provided both for convenience and to confirm that access to the ontology graph 304 is acquired 1102 before the embodiment manages 212 the security posture based on the ontology graph 304. A given embodiment may be configured for device discovery, for security posture management, or for both.

Labels (a) and (b) serve double duty herein. Accordingly, when the device discovery functionality 206 and the security posture management functionality 214 are both being discussed, care should be taken to distinguish, e.g., between the discovery functionality 206 step that is labeled (a) and the security functionality 214 step that is also labeled (a). Likewise, one should distinguish between the discovery functionality 206 step labeled (b) and the security functionality 214 step labeled (b).

Labels (a) and (b) serve double duty in order to prevent confusion when claims directed to only one of the functionalities 206 or 214 are being discussed. Using (f) and (g) in security posture management claims instead of using (a) and (b) as is done here would avoid overlapping with labels in device discovery claims, but would also invite confusion stemming from the absence of any labels (a) through (e) in the security posture management claims.

Some embodiments include the ontology graph 304, as opposed to merely accessing 1104 the graph or merely including software to construct 1008 the graph. In these embodiments, the ontology graph resides in the digital memory 112.

In some of these embodiments, the included ontology graph includes at least one device node 402, at least one facility node 404, and at least one edge 308 between the device node and the facility node.

In some of these embodiments, the included ontology graph includes at least two device nodes 402 which represent respective internet of things devices 218, 102.

In some of these embodiments, the included ontology graph includes a facility-specific cybersecurity score 408 of a physical facility 220.

Some embodiments include ingested telemetry data 312 of devices, as opposed to merely including software to ingest 1002 telemetry. In some of these, the ingested telemetry data resides in stages 1302 of the digital memory. In some, the ingested telemetry data 312 includes at least one of the following: telemetry data in the form of captured packet content 130, or telemetry data in the form of log content 132.

One of skill informed by the teachings of the present disclosure will acknowledge that embodiments may be selected and configured to provide various technical benefits. For example, managing networked devices based on an ontology graph 304 as taught herein provides embodiments with context 902 that includes not merely network topology connectivity relationships 314 but also other relationships 314, which are also relevant to device management. A network topology 508 may only indicate devices 102 and their connectivity 606, e.g., a topology might show that a device-5 is reachable from a device-4 through network communications 406. Ontology graphs 304 go further. In addition to representing network topology, an ontology graph may indicate, e.g., that device-4 is in building-A and device-5 is in building-B. The graph 304 relationship data 316 for devices 102 and physical facilities 220 allows an admin who is using an enhanced system 202 to make plans based on the relationships 314. For instance, an enhanced system 202 might notify 506 the admin about a scheduled interruption of connectivity 606 to building-B 220 during construction, or an equipment upgrade planned for building-B, or when building-B is going to be sold and its personnel and equipment will need to be moved to a different building. Alerts 136 that would be generated absent such relationship data 316 may then be suppressed or automatically resolved, thereby conserving system resources and admin time.

Similarly, suppose the device management software 302 has access to relationship data 316 indicating that several thousand IoT devices 218 are embedded in shipping containers on a ship 804. These devices 218 may be configured, e.g., to alert when the shipping container is opened, or to help track the shipping container's GPS location. Then an interruption of connectivity that corresponds with the ship's planned departure from port need not overwhelm an admin with thousands of alerts 136 when those IoT devices go silent. Likewise, the sudden appearance of several thousand IoT devices 218 on a network 108 may be correlated by the software 302 with the scheduled approach of the ship 804 to a port, when the ship's approach allows the devices 218 to connect with a network as they come into range. Alerts 136 that would be generated absent such correlation may then be suppressed or automatically resolved, thereby conserving system resources and admin time.

Moreover, ontology graph 304 accessibility 1104 supports device security posture management 212 that is facility-specific, which increases security 208 efficiency and effectiveness. Some threats 908 or vulnerabilities 610 target or pertain to a particular facility 220, as opposed to an organization as a whole. The actual or potential impact of a disaster such as a tornado, earthquake, fire, or flood, for example, may be managed 212 more effectively and efficiently if efforts and attention are focused on the particular relevant facility(ies) 220 instead of the larger organization. Management 212 of bomb threats, physical perimeter breaches, and many other events caused by malicious people may likewise benefit from access to data 316 that correlates network assets 102 with physical facilities 220, e.g., by clearly delimiting which assets are at risk.

These example scenarios are illustrative, not comprehensive. One of skill informed by the teachings herein will recognize that many other scenarios and many other variations are also taught. In particular, different embodiments or configurations may vary as to the number or grouping of devices 102, the kinds of devices 102 or networks 108, the kinds of physical facilities 220, or the kinds of relationships 314 between devices and facilities, for example, and yet still be within the scope of the teachings presented in this disclosure.

As further illustrations, some more examples of ontology relationships 314 are: "device-1 is in building W", "device-7 is on ship T", "device-2 accepts only read-only commands from device-3 and both devices are in building B", and "user-1 uses device-4 to connect to device-5 in building C".

Other system embodiments are also described herein, either directly or derivable as system versions of described processes or configured media, duly informed by the extensive discussion herein of computing hardware.

Although specific networked device management architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. For example, a given embodiment may include additional or different data structure implementations of ontology graphs 304 (using linked lists, trees, objects, pointers, tables, arrays, etc.), as well as different technical features, aspects, security controls, mechanisms, criteria, expressions, hierarchies, operational sequences, environment or system characteristics, or other networked device management functionality 206, 214, or 216 teachings noted herein, and may otherwise depart from the particular illustrative examples provided.

Processes (a.k.a. Methods)

Figure 10:
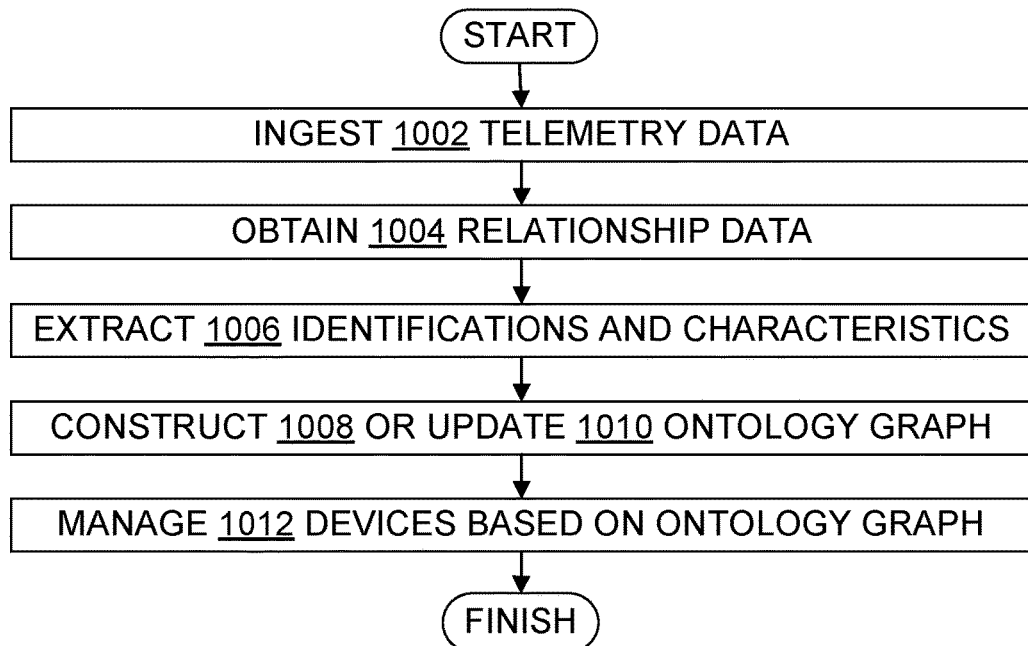
FIG. 10 is a flowchart illustrating steps in some methods for networked device discovery and management.
Figure 11:
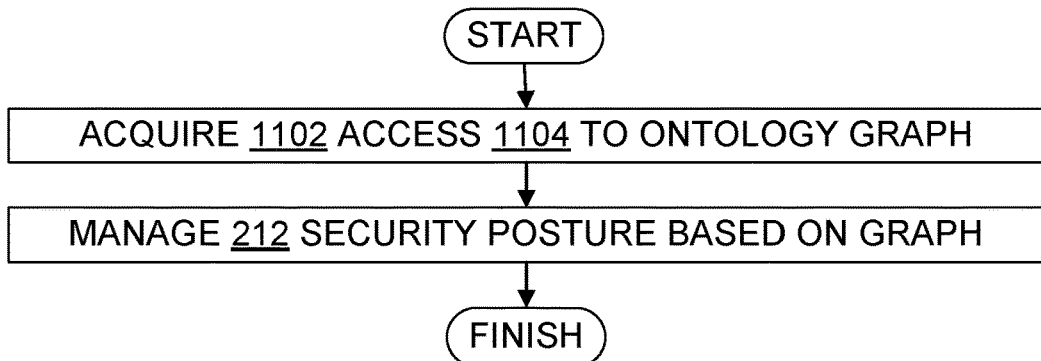
FIG. 11 is a flowchart illustrating steps in some methods for networked device security posture management.
Figure 12:
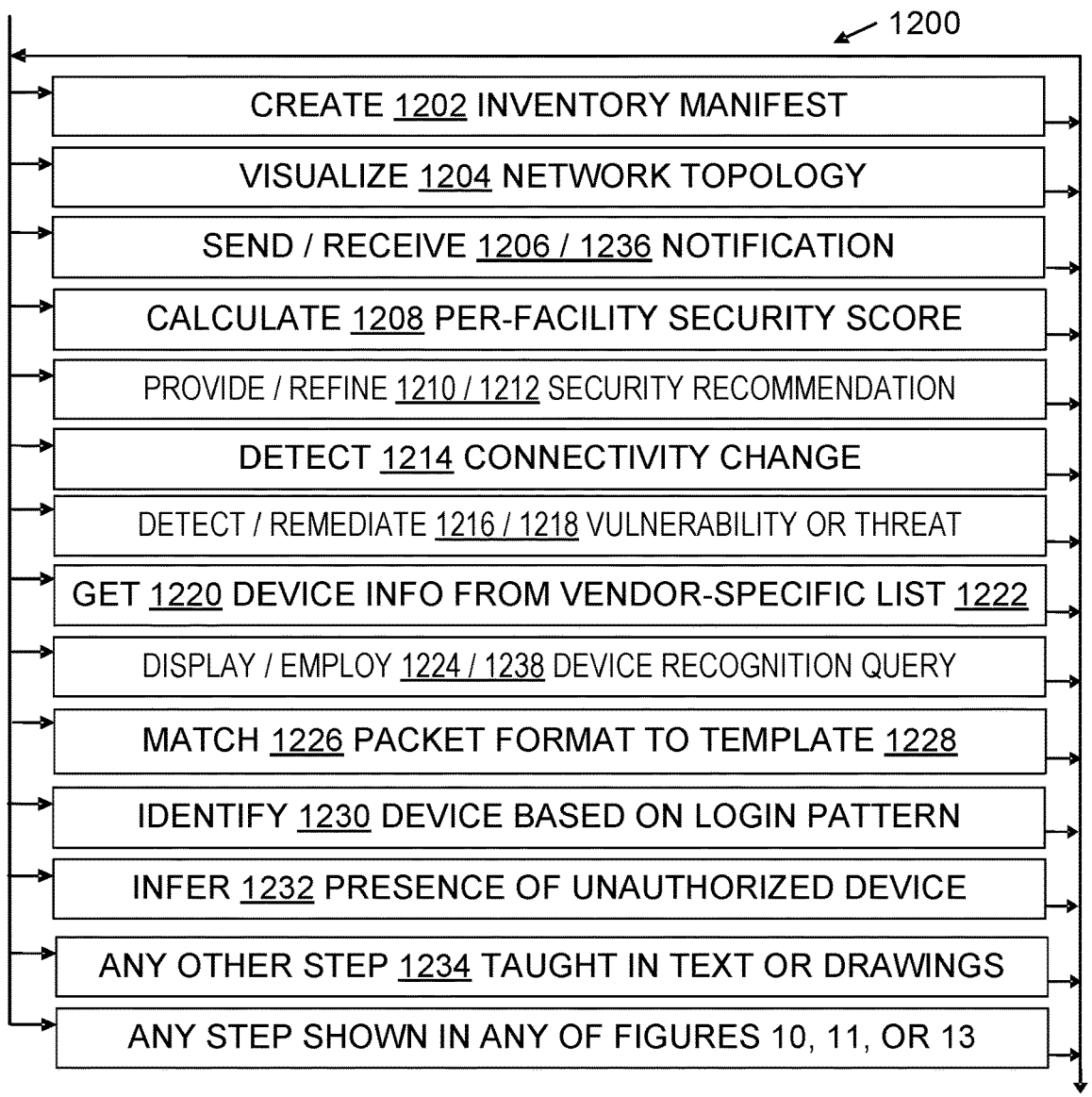
FIG. 12 is a flowchart further illustrating steps in some networked device management methods, incorporating the steps shown expressly or implicitly in FIGS. 10, 11, and 13.
Figure 13:
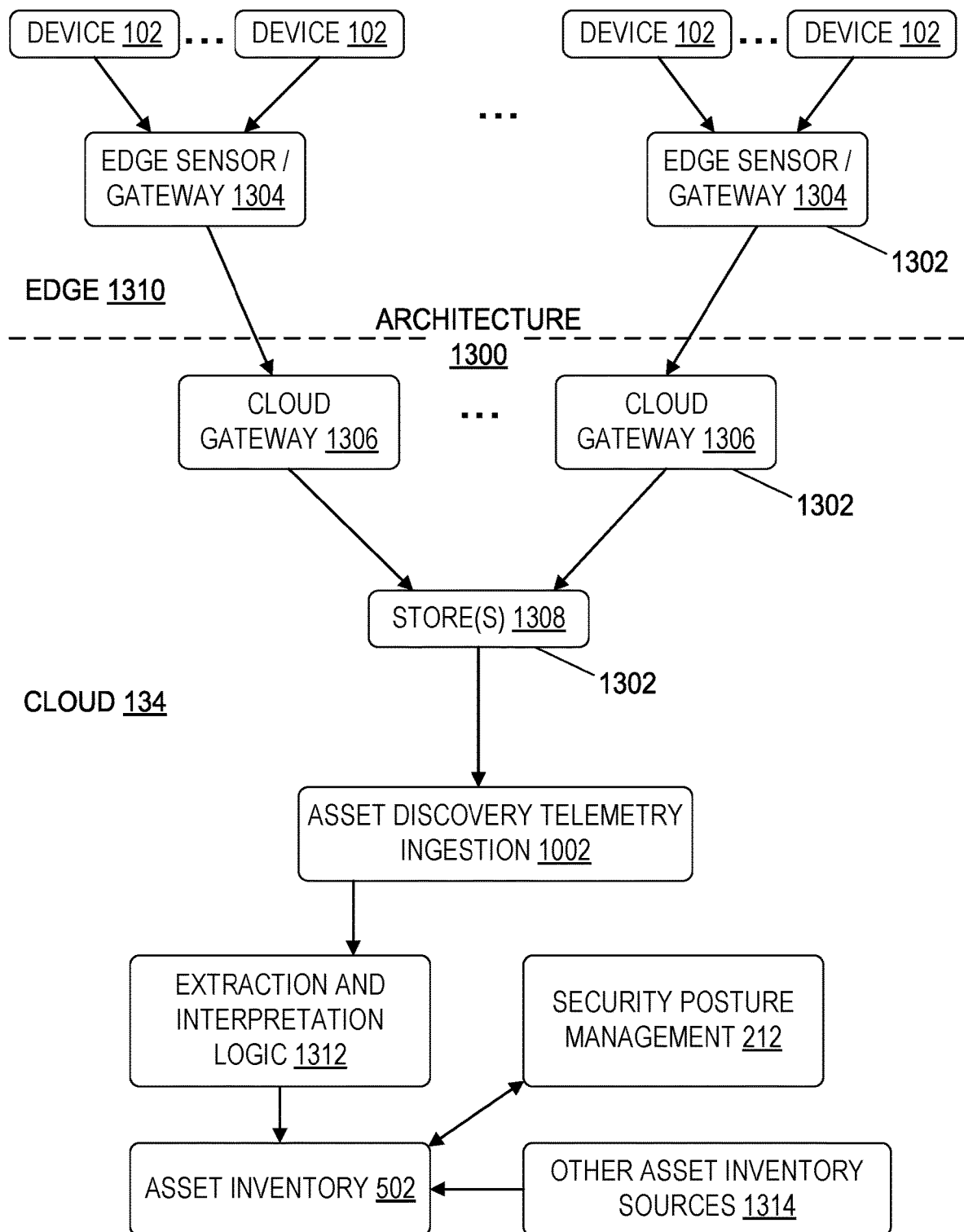
FIG. 13 is a data flow diagram illustrating a staged architecture for networked device management.

Methods (which may also be referred to as "processes" in the legal sense of that word) are illustrated in various ways herein, both in text and in drawing figures. FIGS. 10 and 11 illustrate families of methods 1000 and 1100 that may be performed or assisted by an enhanced system, such as system 202 or another networked device management functionality enhanced system as taught herein. FIG. 13 shows a networked device management architecture with implicit or explicit actions, e.g., steps for collecting data, transferring data, storing data, and otherwise processing data. FIG. 12 includes some refinements, supplements, or contextual actions for steps illustrated by FIGS. 10, 11, and 13, and incorporates the steps of those Figures as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may type in a value for the system 202 to use as a facility 220 name. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 10-13. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1200 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method 1000 for networked device discovery and management, the method performed (executed) by a computing system, the method including: ingesting 1002 telemetry data 312 of devices 102; obtaining 1004 relationship data 316 which specifies one or more relationships 314 between at least some of the devices 102 and one or more physical facilities 220; extracting 1006 device identifications 318 and device characteristics 320 from the ingested telemetry data; constructing 1008 or updating 1010 an ontology graph 304, the ontology graph having device nodes 402, facility nodes 404, and edges 308, each edge between a device node and a facility node representing a relationship 314 between a corresponding device 102 and a physical facility 220, each edge between two device nodes representing a network communication 406 between the corresponding devices; and managing 1012 at least one of the devices based on the ontology graph.

Some embodiments provide or utilize a method 1100 for networked device security posture management 212, the method executed by a computing system, the method including: acquiring 1102 access 1104 to an ontology graph 304 which has device nodes 402, facility nodes 404, and edges 308, each edge between a device node and a facility node representing a relationship 314 between a corresponding device 102 and a physical facility 220, each edge between two device nodes representing network communication 406 between the corresponding devices; and managing 212 a security posture of at least one of the devices based on the ontology graph.

Note that "managing" is used herein both with regard to networked devices generally and with regard to networked device security in particular. Security management 212 is a subset of management generally 1012. Accordingly, a method 1200 may include steps of a method 1100 or a method 1000 or both. Unless otherwise indicated, a networked device management method herein is presumed to be a method 1200.

In some embodiments, managing 1012 at least one of the devices based on the ontology graph includes at least one of: creating 1202 an inventory manifest 504; visualizing 1204 a network topology 508; sending 1206 a notification 506 of an unknown device 708; sending 1206 a notification 506 of a previously inactive device that is active again; sending 1206 a notification 506 of a previously active device that is no longer active; or managing 212 a security posture 210.

In some embodiments, managing 212 at least one of the devices based on the ontology graph includes at least one of: sending 1206 a notification 506 of an unknown device 708; sending 1206 a notification 506 of a previously inactive device that is active again; or sending 1206 a notification 506 of a previously active device that is no longer active.

In some embodiments, managing 1012 or 212 at least one of the devices based on the ontology graph includes calculating 1208 a per-facility security score 408 or 410. A device security score (a.k.a. "risk rating") may be calculated, e.g., by a rule-based system, procedure, statistical module, or machine learning model, based on input values such as values representing misconfigurations, omitted updates, and other vulnerabilities, attack surface, recent threat activity, and so on. A facility security score 408 or 410 may then be calculated as an average of the security scores of the devices which are located within or otherwise related 314 to the facility. In a variation, the facility security score 408 or 410 may be calculated as the minimum (least secure) of the security scores of the devices which are located within or otherwise related 314 to the facility. Attributes 924 of the facility 220 which are stored in the facility node 404 may also be inputs, e.g., indicating physical security measures such as fencing, guards, and ID badge requirements for access. Other formulas may also be used to calculate 1208 a per-facility security score 408 or 410 from the security scores of items or controls located within or otherwise related 314 to the facility.

In some embodiments, the method 1200 includes refreshing 1010 the ontology graph 304 in response to at least one of the following refresh conditions: an expiration 604 of a scheduled service period 602; a detection 1214 of connectivity 606 after a period of non-connectivity; a detection 1214 of non-connectivity after a period of connectivity 606; a detection 1216 of an asset security vulnerability 610 (e.g., via a probe such as a packet-sniff or a health check); a remediation 1218 of an asset security vulnerability 610 (e.g., through change in the configuration of the asset); a notification 1236 of a change 616 of administrative control 614 or legal control 614 of a physical facility 220 (e.g., via a change management system notice); or a mission criticality attribute 618 of a device.

In some embodiments, extracting 1006 device identifications and device characteristics from the ingested telemetry data includes querying 1238 a device; this approach employs 1238 a device API, for example, instead of asking an admin. In some embodiments, a query 918 is displayed 1224 to an admin to see whether a device is recognized 710. That is, some methods 1200 include displaying 1224 a device recognition query 918 via a user interface 124, and conforming 1010 the ontology graph according to a response 920 to the device recognition query.

In some embodiments, the method 1200 includes getting 1220 device identifications 318 or device characteristics 320 or both from a vendor-specific inventory list 1222, e.g., a spreadsheet supplied by the vendor when the devices were purchased. In some of these situations, the device nodes 402 collectively represent devices 102 from multiple vendors 412, so the vendor-specific inventory list 1222 provides only part of the data 318, 320 used in a graph 304.

In some embodiments, extracting 1006 device identifications 318 and device characteristics 320 from the ingested telemetry data 312 includes matching 1226 a format of a captured packet 130 to a format template 1228 which corresponds to at least one of: a device category 702; or a device manufacturer 704. For example, the format template 1228 may specify a signature value in a MAC address or at a particular location in a packet header.

In some embodiments, extracting 1006 device identifications 318 and device characteristics 320 from the ingested telemetry data 312 includes identifying 1230 a device based on a login pattern 706. The login pattern 706 may include, e.g., a username or other account identifier that follows a manufacturer's naming convention, or a device ID assigned by the device's manufacturer.

In some embodiments, extracting 1006 device identifications 318 and device characteristics 320 from the ingested telemetry data 312 includes inferring 1232 a presence of an unauthorized gateway 712, e.g., a gateway 1304 or 1306, which is in network communication 406 or 606 with at least one recognized device 710 but is not itself recognized.

In some embodiments, a facility node 404 of the ontology graph 304 represents at least one of the following physical facilities 220: a vehicle 800, 802 equipped for travel by land, a vehicle 800, 804 equipped for travel by water, a vehicle 800, 806 equipped for travel by air, a vehicle 800, 808 equipped for travel in space, or a facility 810, 220 having devices 102 which include industrial control system devices 812.

In some embodiments, the method 1200 includes managing 212 the security posture 210 of a particular device 102 by providing 1210 a security recommendation 904 which is based on at least: a characteristic 320 of the particular device that is represented in the ontology graph 304, and a network context 902 of the particular device that is represented in the ontology graph. For example, based on the ontology graph 304 an embodiment may recommend that particular users stop using shared accounts, or recommend that the users stop using local account on devices, or recommend that a particular device not have direct connection to the internet.

In some embodiments, the method 1200 includes managing 212 the security posture 210 of a particular device 102 by providing 1210 a security recommendation 904 which is based on at least: a correlation 906 of characteristics 320 of at least two devices which are represented in the ontology graph 304. For example, an embodiment may recommend that devices which have connected to the network after an apparent infection data of another device be forensically inspected for infection and that connections requests from other devices be refused during a quarantine period.

In some embodiments, the method 1200 includes managing 212 the security posture 210 of a particular device 102 by providing 1210 a security recommendation 904 which is based on at least: a facility-specific security score 410 of a physical facility 220 which is represented in the ontology graph.

In some embodiments, the method 1200 includes managing 212 the security posture 210 of a particular device 102 by providing 1210 a security recommendation 904 that sharing 922 of a shared device 102 be reduced or suspended or terminated. For example, if a device is observed to accept unexpected external commands while inside a datacenter, an embodiment may recommend that the device no longer be used, at least not until it has been forensically inspected and cleansed of any potential infection.

In some embodiments, the method 1200 includes discerning 1216 a threat 908 or a vulnerability 610 based on a subgraph 910 of the ontology graph.

In some embodiments, the method 1200 includes discerning 1216 a threat 908 or a vulnerability 610 based at least in part on aggregated data 912 of a network which is not represented in the ontology graph.

In some embodiments, the method 1200 includes refining 1212 a security posture recommendations model 914 based on feedback 916 about a recommendation 904 produced by the security posture recommendations model.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as networked device management software 302, ontology graphs 304, security scores 322, security recommendations 904, aggregated data 912, and queries 918, in the form of data 118 and instructions 116, read from a removable storage medium 114 and/or another source such as a network connection, to form a configured storage medium. The configured storage medium 112 is capable of causing a computer system 102 to perform technical process steps for networked device management, as disclosed herein. The Figures thus help illustrate configured storage media embodiments and process (a.k.a. method) embodiments, as well as system and process embodiments. In particular, any of the process steps illustrated in FIGS. 10 through 13, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method 1000 for networked device discovery and management. This method includes: ingesting 1002 telemetry data of devices; obtaining 1004 relationship data which specifies one or more relationships between at least some of the devices and one or more physical facilities; extracting 1006 device identifications and device characteristics from the ingested telemetry data; constructing 1008 or updating 1010 an ontology graph, the ontology graph having device nodes, facility nodes, and edges, each edge between a device node and a facility node representing a relationship between a corresponding device and a physical facility, each edge between two device nodes representing a network communication between the corresponding devices, the ontology graph including at least twenty device nodes which represent respective internet of things devices; and managing 1012 at least one of the devices based on the ontology graph.

1010 computationally update some portion of an ontology graph 304; update may also be referred to as "refresh" or "conform"; may be attempted periodically, e.g., daily In some embodiments, the method 1000 includes refreshing 1010 the ontology graph in response to at least one of the following refresh conditions: a detection of connectivity after a period of non-connectivity; or a notification of a change of administrative control or legal control of a physical facility.

In some embodiments, the method 1000 includes refreshing 1010 the ontology graph in response to at least one of the following refresh conditions: a detection of an asset security vulnerability; or a remediation of an asset security vulnerability.

In some embodiments, the method 1000 includes refreshing 1010 the ontology graph in response to a mission criticality attribute of a device. For instance, a robot controller 812 device node 402 could be refreshed more often than an internal website device node 402, which in turn is refreshed more often than a backup server device node 402.

Some embodiments use or provide a computer-readable storage device 112, 114 configured with data 118 and instructions 116 which upon execution by at least one processor 110 cause a computing system to perform a method 1100 for networked device security posture management. This method includes: acquiring 1102 access to an ontology graph which has device nodes, facility nodes, and edges, each edge between a device node and a facility node representing a relationship between a corresponding device and a physical facility, each edge between two device nodes representing network communication between the corresponding devices, the ontology graph including at least ten device nodes which represent respective internet of things devices; and managing 212 a security posture of at least one of the devices based on the ontology graph.

In some embodiments, the method 1100 includes reading from the ontology graph a facility-specific security score 410 of a physical facility, or writing to the ontology graph a facility-specific security score 410 of a physical facility.

In some embodiments, managing 212 a security posture of at least one of the devices based on the ontology graph includes managing the security posture of a device which is located in at least one of the following physical facilities: a vehicle equipped for travel by land, a vehicle equipped for travel by water, a vehicle equipped for travel by air, or a vehicle equipped for travel in space.

In some embodiments, managing 212 a security posture of at least one of the devices based on the ontology graph includes managing the security posture of an industrial control system device.

In some embodiments, the method 1100 further includes refreshing 1010 the ontology graph.

Additional Observations

Additional support for the discussion of networked device management functionality 216 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Some embodiments provide or utilize systems, processes, or apparatus to enable intelligent discovery of electronic assets in a cyber-physical environment to enable security posture management. Some embodiments provide or utilize a unique asset detection strategy in a scalable manner to support security posture management through telemetry from field and cloud gateways. Some embodiments provide or utilize an intelligent overlay of security threats over electronic assets within a physical and cyber-physical environment derived from ontologies and interaction information of assets and physical world.

Some embodiments utilize relationships of assets connected in various facilities and their telemetry to derive threats comparing them with similar telemetry patterns and historical context, resulting in secure, compliant, and scalable embodiments which enable an AI-driven approach to problem solving. As used herein, "AI" includes machine learning, expert systems, and other artificial intelligence technologies.

Technical Character

The technical character of embodiments described herein will be apparent to one of ordinary skill in the art, and will also be apparent in several ways to a wide range of attentive readers. Some embodiments address technical activities such as reading network packets 130, reading event logs 132, constructing 1008 or updating 1010 an ontology graph data structure 304, or detecting 1214 network connectivity changes, which are each an activity deeply rooted in computing technology. Some of the technical mechanisms discussed include, e.g., networked device management software 302, an ontology graph data structure 304, machine learning models 914, packet format templates 1228, and a multistage architecture per FIG. 13. Some of the technical effects discussed include, e.g., reliable discovery 1214 of unrecognized devices 708, security management 212 tailored to a particular facility 220, and inventory 502 manifests which are current and are not limited to a particular vendor 412. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas, they are not. Rather, the present disclosure is focused on providing appropriately specific embodiments whose technical effects fully or partially solve particular technical problems, such as how to formulate device management recommendations based on context 902, as opposed to more general recommendations that do not apply as well to the specific device and its circumstances. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPS: global positioning system
GPU: graphical processing unit
GUI: graphical user interface HTTPS: hypertext transfer protocol, secure
IaaS or IAAS: infrastructure-as-a-service
ID: identification or identity
LAN: local area network
MAC address: media access control address
OS: operating system
PaaS or PAAS: platform-as-a-service
RAM: random access memory
ROM: read only memory
SIEM: security information and event management, or tool for the same
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"IoT" or "Internet of Things" means any networked collection of addressable embedded computing or data generation or actuator nodes. An individual node is referred to as an internet of things device 218 or IoT device 218. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Networked device management operations such as extracting 1006 device identifications 318 from telemetry data 312, constructing 1008 an ontology graph 304, and many other operations discussed herein, are understood to be inherently digital. A human mind cannot interface directly with a CPU or other processor, or with RAM or other digital storage, to read and write the necessary data to perform the networked device management steps 1200 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac gadget" and that claim limitation became subject to means-plus-function interpretation, then at a minimum all structures identified anywhere in the specification in any figure block, paragraph, or example mentioning "zac gadget", or tied together by any reference numeral assigned to a zac gadget, or disclosed as having a functional relationship with the structure or operation of a zac gadget, would be deemed part of the structures identified in the application for zac gadget and would help define the set of equivalents for zac gadget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, acquiring, calculating, constructing, creating, detecting, displaying, employing, executing, extracting, getting, identifying, inferring, ingesting, managing, matching, obtaining, performing, providing, receiving, refining, remediating, sending, updating (a.k.a. "refreshing"), visualizing (and accesses, accessed, acquires, acquired, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102

101 machine in a system 102, e.g., any device having at least a processor 110 and a memory 112 and also having a distinct identifier such as an IP address or a MAC (media access control) address; may be a physical machine or be a virtual machine implemented on physical hardware 102 computer system, also referred to as a "computational system" or "computing system", and when in a network may be referred to as a "node"
104 users, e.g., user of an enhanced system 202; refers to a human or a human's online identity unless otherwise stated
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 tools, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 network packet; digital
132 event log, alert log, security log, audit trail, or other record of activity on a device or in a network; digital
134 cloud, cloud computing environment
136 security alert; digital
202 system 102 enhanced with networked device management functionality 206, 214, or 216
204 device discovery; computational activity of determining that a particular device was or is active on a network 108, or a digital result of such computational activity
206 functionality for networked device management that includes device discovery; may also referred to as device discovery functionality 206; e.g., software or specialized hardware which performs or is configured to perform steps 1002 through 1008 or steps 1002 through 1006 plus step 1010, or any software or hardware which performs or is configured to perform a method 1000 or a computational device discovery activity first disclosed herein
208 security, e.g., risk identification or mitigation, especially as it pertains to devices 102, networks 108, and facilities 220 which are related to a device 102 or a network 108
210 security posture, e.g., current device or network configuration with respect to software version, port status, logging, authentication and authorization requirements, security controls, backups, and other aspects that may impact data confidentiality, data integrity, data availability, or compliance with regulatory standards or organization policies
212 security posture management, e.g., computational activity of determining, monitoring, or altering a security posture
214 functionality for networked device management that includes security posture management; may also referred to as security posture functionality 214; e.g., software or specialized hardware which performs or is configured to perform steps 1102 or 1104 plus step 212, or any software or hardware which performs or is configured to perform a method 1100 or a computational device discovery activity first disclosed herein
216 device discovery functionality 206 in a combination with security posture functionality 214
218 internet of things device; also referred to as an "IoT device"
220 physical facility, e.g., a building 814 or a vehicle 800
302 networked device management software, e.g., software which upon execution performs at least step 1008, step 1010, or step 1104 in conjunction with at least step 1012
304 ontology graph data structure; also referred to as ontology graph; digital
306 ontology graph node; digital; some examples are device nodes 402 and facility nodes 404
308 ontology graph edge; digital
310 interface generally; computational
312 telemetry data; digital; may include, e.g., device IP addresses, device MAC addresses; may follow formats which are device-category-specific or device-manufacturer-specific
314 relationship between nodes 306, as represented digitally; e.g., nodes are (not) connected, device is (not) in facility, and so on
316 relationship data, e.g., data from which an edge 308 or a node 306 characteristic is derived; digital
318 device identification, e.g., name, serial number, IP address, or MAC address; digital
320 device characteristic, e.g., category, manufacturer, install date, version, operational status, associated user or user group, admin notes, etc.; digital
322 security score generally, including facility-specific security scores and other security scores, and including cybersecurity scores and other security scores; digital
402 device node data structure; also referred to as "device node"; digital representation of a device 102 in a graph 304
404 facility node data structure; also referred to as "facility node"; digital representation of a facility 220 in a graph 304
406 past or current network communication or evidence thereof; digital
408 facility-specific cybersecurity score; digital; example of score 410
410 facility-specific security score; digital; also referred to as a per-facility security score
412 device vendor, as represented digitally
502 asset inventory, e.g., devices 102 present in a network
504 inventory manifest, as represented digitally; e.g., list of devices 102 including at least device identifications
506 notification; digital as represented digitally
508 network topology; documentation which indicates devices thought (by whomever created the topology) to be present in a network and the wired or wireless communication paths thought to connect the devices; may be digital
510 visualization of network topology; digital graphical representation of a topology 508
600 graph refresh condition, as implemented computationally
602 computing system or facility service period, as represented digitally
604 expiration of a period 602, as represented digitally
606 network connectivity, as represented digitally 608 change in connectivity, as represented digitally
610 security vulnerability, as represented digitally
612 change in vulnerability, as represented digitally
614 control of a computing system or a facility or a resource therein, as represented digitally
616 change in control 614, as represented digitally
618 mission criticality attribute, e.g., priority level or group, classification level or group, audit level or group, as represented digitally
620 particular attribute digital value
702 device category, as represented digitally, e.g., temperature sensor, camera, accelerometer, motion detector, manufacturing process controller, router, firewall, switch, virtual machine, etc.; possible values may be specified, e.g., by default or by an admin or both
704 device manufacturer, as represented digitally, e.g., vendor 412 ID or vendor category such as "internal" or "external"
706 login pattern, e.g., sequence of packets exchanged during login, login protocol, login authentication steps, etc., as represented digitally
708 unrecognized device, as represented digitally; a device may be unrecognized in the sense, e.g., that it is not found in the ontology graph or not found in any available inventory manifest, or both
710 recognized device, as represented digitally; a device that is not unrecognized
712 unauthorized device, as represented digitally; a device lacking authorization to be on the network or to perform a given computational activity; an unauthorized device may be recognized 710 or unrecognized 708
714 authorized device, as represented digitally; a device having authorization to be on a network or to perform a given computational activity; an authorized device is normally also a recognized device 710 except on wide-open guest networks (which should be air-gapped from any secured network)
800 vehicle generally, as represented digitally
802 vehicle 800 which is capable of at least land travel, e.g., cars, trucks, trains; as represented digitally
804 vehicle 800 which is capable of at least water travel, e.g., ships, submarines; as represented digitally
806 vehicle 800 which is capable of at least air travel, e.g., airplanes, balloons; as represented digitally
808 vehicle 800 which is capable of at least space travel, e.g., space shuttle, satellite; as represented digitally
810 industrial control facility, e.g., manufacturing plant, processing plant, warehouse, factory, or vehicle 800 station or port
812 industrial control device, e.g., IoT device for manufacturing or chemical processing
814 building; associated real estate, and associated infrastructure such as connections and internal conduits for power, water, natural gas, and networking, are treated as part of a building unless indicated otherwise
902 context of a device in a network, as represented digitally; may include the device's own attribute(s) 924, part or all of the device's neighboring-via-connectivity topology 508, as well as facility(ies) 220 related 314 to the device and any or all attributes 924 of the devices or networks or facilities which communicate(d) 406 with the device
904 security recommendation, as represented digitally; e.g., description or commands to identify or remediate a security 208 risk
906 characteristics correlation; computational; may be performed, e.g., by a machine learning model or expert system
908 security threat, as represented digitally
910 subgraph of an ontology graph 304; a subgraph is also itself a graph
912 aggregated data of multiple service provider customers or cloud tenants or other sources of information about security postures; digital; aggregated data has had confidential or private values removed, summarized, obfuscated, tokenized, or otherwise protected from disclosure to a party that lacks authorization to view or process said confidential or private values
914 security posture recommendations machine learning model; computational; may be trained on subgraph 910 data from actual incidents via supervised learning, for example
916 feedback from admin or other user on security posture recommendation accuracy or completeness; digital
918 device recognition query; digital; e.g., "Do you recognize device ROUTER3 which first appeared in the network 4 minutes ago?"
920 response to query 918; digital
922 device sharing, e.g., attribute or computational status or activity
924 attribute of a device, a network, or a facility, e.g., any of items 318, 320, 410, 618, 922 as represented digitally
1000 flowchart; 1000 also refers to networked device discovery and management methods that are illustrated by or consistent with the FIG. 10 flowchart
1002 computationally ingest telemetry data 312, e.g., via an API
1004 computationally obtain relationship data 316, e.g., via an API
1006 computationally extract identification data 318 or characteristic data 320 or both, from telemetry data 312, e.g., via lexical analysis, parsing, scanning, string comparison, or other computational activity
1008 computationally construct an ontology graph 304
In some embodiments, the method 1000 includes refreshing 1010 the ontology graph in response to an expiration 604 of a scheduled service period 602. For instance, the graph 304 could be refreshed after a new router is brought into service, or after workstations are replaced by tablets.
1012 computationally manage at least one device 102 based at least in part of at least a portion of an ontology graph 304
1100 flowchart; 1100 also refers to networked device security posture management methods that are illustrated by or consistent with the FIG. 11 flowchart
1102 computationally acquire access to an ontology graph 304, e.g., by acquiring, in a memory 112 which is in operable communication with a processor 110, a pointer to, an index of, a handle of, or another identifier of, the graph 304
1104 computationally access an ontology graph 304, e.g., by reading a value from the graph or writing a value to the graph, via computational activity
1200 flowchart; 1200 also refers to networked device management methods that are illustrated by or consistent with the FIG. 12 flowchart, which incorporates the steps of the FIG. 10 flowchart, the FIG. 11 flowchart, and the FIG. 13 data flow diagram 1202 computationally create an inventory manifest, e.g., by creating a file based on data read from device nodes 402

1204 computationally visualize a network topology 508, e.g., by configuring a display 126 based on data read from device nodes 402 and edges 308

1206 computationally send a notification, e.g., via an API 1208 computationally calculate a per-facility security score 410

1210 computationally formulate (e.g., via an expert system or model 914 and based on a graph 304) and provide (e.g., via an API, by configuring a display) a security recommendation 904

1212 computationally refine an expert system or model 914 or a graph 304 or a security recommendation 904, based on feedback 916, e.g., by further training of the model or rule changes in the expert system 1214 computationally detect a connectivity change, e.g., via error message or timeout or polling for a connectivity loss, or via success ack or incoming communication from previously silent device or from unrecognized device for a connectivity addition 1216 computationally detect a vulnerability or threat, e.g., via an intrusion detection system, antivirus tool, security scan, SIEM, or other security tool or activity 1218 computationally remediate a vulnerability or threat, e.g., by mitigation, avoidance, transfer, or explicit acceptance, using a security tool or control 1220 computationally get device info from a vendor-specific list, e.g., by parsing, lexical analysis, scanning, optical character recognition, or other computational extraction of data from a structure data document 1222 vendor-specific list of device 102 data, e.g., identifications 318 and characteristics 320 in readable form 1224 computationally configure a display 126 to display (verb) a device recognition query 918

1226 computationally match a packet to a template, e.g., by extracting data from specific positions in the packet and comparing that data to template data 1228 packet template data structure 1230 computationally identify a device based on a login pattern that is associated with the device 1232 computationally infer the presence of an unauthorized device, e.g., by determining that a device which is sender or receiver of a packet is not in a set of recognized devices and their respective addresses 1234 any step discussed in the present disclosure that has not been assigned some other reference numeral; 1234 may thus be shown expressly as a reference numeral for various steps, and may be added as a reference numeral for various steps without thereby adding new matter to the present disclosure 1236 computationally receive a notification, e.g., via an API 1238 computationally employ a device recognition query 918 in the form of an inquiry to a device API which is configured to respond with device characteristic data; query response may include, e.g., operating system version and ID, firmware version, and other characteristic data 1300 data flow diagram, also referred to as architecture diagram; 1300 also refers to networked device management architectures that are illustrated by or consistent with the FIG. 13 diagram 1302 storage stage for staged transmittal of telemetry data 1304 gateway device in edge; also referred to as edge gateway or edge sensor ("sensor" in this context means data collector or data processor generally, e.g., Microsoft Defender for IoT™ is a sensor, as opposed to the meaning of "sensor" as a temperature sensor, humidity sensor, pressure sensor, light sensor, etc. that senses a physical condition at a real world location) (mark of Microsoft Corporation)

1306 gateway device in cloud; also referred to as cloud gateway 1308 storage in cloud, e.g., blob, container, memory, file system, etc.

1310 edge region or area or zone, as opposed to cloud region or area or zone; an on-premise or on-facility region or area or zone is an example of an edge 1310

1312 computing system 102 configured to perform extraction 1006

1314 asset inventory source, e.g., queryable 1238 device API, vendor-specific inventory list 1222, user interface or API of change management database or change management system

CONCLUSION

In short, the teachings herein provide a variety of networked device management functionalities 206, 214, 216 which operate in enhanced systems 202. In some embodiments, networked device 102 management 1012 is based on an ontology graph 304 which includes device nodes 402, physical facility 220 nodes 404, and edges 308. The ontology graph 304 may go beyond network topology 508 by also documenting aspects of an environment 100 such as: relationships 314 between devices 102 and facilities 220, facility attributes 924 such as facility-specific security scores 410, and device characteristics 320 such as whether a device is recognized 710, whether a device is authorized 714, and a device's mission criticality 618. Medical devices 218, physical condition sensors 218, and other internet of things devices 218, including those 218 embedded in vehicles 800, those 218 located on a vehicle 800, those 218, 812 used for industrial control, or those 218 intermittently air-gapped, or combinations thereof, are managed 1012. Devices 102 may be discovered 204 by extraction 1006 of identifications 318 and characteristics 320 from telemetry data 312 in a staged architecture 1300. Security postures 210 may be assessed 212, and security recommendations 904 based on device context 902 may be provided 1210. Other management 1012 activities and associated activities are also described herein.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment.

Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

The invention claimed is:

1. A computing system which is configured to secure a networked device, the computing system comprising: a digital memory; a processor in operable communication with the digital memory, the processor configured to execute networked device security operations including: (a) acquiring access to an ontology graph which has device nodes, facility nodes, and edges, each edge between a device node and a facility node representing a relationship between a corresponding device and a physical facility, each edge between two device nodes representing network communication between two corresponding devices, the facility node representing the physical facility itself as opposed to any of the following: a device, a device component, a network endpoint, a computing system hardware component, or a network component, and (b) securing at least in part by use of artificial intelligence at least one of the devices based on the ontology graph, the securing comprising at least one of: detecting connectivity of a device after a period of non-connectivity, detecting non-connectivity of a device after a period of connectivity, detecting security vulnerability of a device, remediating a security vulnerability of a device, sending via the computing system a notification of a change of administrative control or legal control of the physical facility which is represented by the facility node, or sending via the computing system a notification of a change of a mission criticality attribute of a device, the securing also comprising calculating a risk rating or a security score by using a machine learning model with one or more of the following as inputs to the machine learning model: a value representing a misconfiguration, a value representing an omitted update, a value representing a vulnerability, a value representing an attack surface, a value representing a recent attack, or a value representing a physical security measure.

2. The system of claim 1, further comprising the ontology graph, wherein the ontology graph resides in the digital memory, and wherein the ontology graph includes at least one device node, at least one facility node, and at least one edge between the at least one device node and the at least one facility node.

3. The system of claim 1, further comprising the ontology graph, wherein the ontology graph resides in the digital memory, and wherein the ontology graph includes at least two device nodes which represent respective internet of things devices.

4. The system of claim 1, further comprising the ontology graph, wherein the ontology graph resides in the digital memory, and wherein the ontology graph includes a facility-specific cybersecurity score of a physical facility, the facility-specific cybersecurity score based on at least the security score which was calculated by using the machine learning model.

5. A method for securing a networked device, the method executed by a computing system, the method comprising: acquiring access to an ontology graph which has device nodes, facility nodes, and edges, each edge between a device node and a facility node representing a relationship between a corresponding device and a physical facility, each edge between two device nodes representing network communication between two corresponding devices, the facility node representing the physical facility itself as opposed to any of the following: a device, a device component, a network endpoint, a computing system hardware component, or a network component; and securing at least in part by use of artificial intelligence at least one of devices based on the ontology graph, the securing comprising at least one of: detecting connectivity of a device after a period of non-connectivity, detecting non-connectivity of a device after a period of connectivity, detecting security vulnerability of a device, remediating a security vulnerability of a device, sending via the computing system a notification of a change of administrative control or legal control of the physical facility which is represented by the facility node, or sending via the computing system a notification of a change of a mission criticality attribute of a device, the securing also comprising calculating a risk rating or a security score by using a machine learning model with one or more of the following as inputs to the machine learning model: a value representing a misconfiguration, a value representing an omitted update, a value representing a vulnerability, a value representing an attack surface, a value representing a recent attack, or a value representing a physical security measure.

6. The method of claim 5, comprising managing the security posture of a particular device by providing a security recommendation which is based on at least: a characteristic of the particular device that is represented in the ontology graph, and a network context of the particular device that is represented in the ontology graph.

7. The method of claim 5, comprising managing a security posture of a particular device by providing a security recommendation which is based on at least: a correlation of characteristics of at least two devices which are represented in the ontology graph.

8. The method of claim 5, comprising managing a security posture of a particular device by providing a security recommendation which is based on at least: a facility-specific security score of a physical facility which is represented in the ontology graph and which is based on at least the security score which was calculated by using the machine learning model.

9. The method of claim 5, comprising managing a security posture of a particular device by providing a security recommendation that sharing of a shared device be reduced or suspended or terminated.

10. The method of claim 5, further comprising discerning a threat or a vulnerability based on a subgraph of the ontology graph.

11. The method of claim 5, further comprising discerning a vulnerability or a threat based at least in part on aggregated data of a network which is not represented in the ontology graph.

12. The method of claim 5, wherein the machine learning model comprises a security posture recommendations machine learning model, and the method comprises refining the security posture recommendations machine learning model based on feedback about a recommendation produced by the security posture recommendations machine learning model.

13. The method of claim 5, further comprising refreshing the ontology graph in response to at least one of the following refresh conditions: an expiration of a scheduled service period; a detection of connectivity after a period of non-connectivity; a detection of non-connectivity after a period of connectivity; a detection of an asset security vulnerability; a remediation of an asset security vulnerability; a notification of a change of administrative control or legal control of a physical facility; or a mission criticality attribute of a device.

14. The method of claim 5, wherein managing a security posture of at least one of devices based on the ontology graph comprises at least one of: sending a notification of an unknown device; sending a notification of a previously inactive device that is active again; or sending a notification of a previously active device that is no longer active.

15. The method of claim 5, wherein managing a security posture of at least one of devices based on the ontology graph comprises displaying a device recognition query via a user interface.

16. A computer-readable storage device configured with data and instructions which upon execution by a processor cause a computing system to perform a method to secure a networked device, the method comprising: acquiring access to an ontology graph which has device nodes, facility nodes, and edges, each edge between a device node and a facility node representing a relationship between a corresponding device and a physical facility, each edge between two device nodes representing network communication between two corresponding devices, the facility node representing the physical facility itself as opposed to any of the following: a device, a device component, a network endpoint, a computing system hardware component, or a network component, the ontology graph including at least ten device nodes which represent respective internet of things devices; and securing at least in part by use of artificial intelligence at least one of devices based on the ontology graph, the securing comprising at least one of: detecting connectivity of a device after a period of non-connectivity, detecting non-connectivity of a device after a period of connectivity, detecting security vulnerability of a device, remediating a security vulnerability of a device, sending via the computing system a notification of a change of administrative control or legal control of the physical facility which is represented by the facility node, or sending via the computing system a notification of a change of a mission criticality attribute of a device, the securing also comprising calculating a risk rating or a security score by using a machine learning model with one or more of the following as inputs to the machine learning model: a value representing a misconfiguration, a value representing an omitted update, a value representing a vulnerability, a value representing an attack surface, a value representing a recent attack, or a value representing a physical security measure.

17. The computer-readable storage device of claim 16, wherein the method further comprises reading from the ontology graph a facility-specific security score of a physical facility which is based on at least the security score which was calculated by using the machine learning model, or writing to the ontology graph a facility-specific security score of a physical facility which is based on at least the security score which was calculated by using the machine learning model.

18. The computer-readable storage device of claim 16, wherein managing a security posture of at least one of devices based on the ontology graph comprises managing the security posture of a device which is located in at least one of the following physical facilities: a vehicle equipped for travel by land, a vehicle equipped for travel by water, a vehicle equipped for travel by air, or a vehicle equipped for travel in space.

19. The computer-readable storage device of claim 16, wherein managing a security posture of at least one of devices based on the ontology graph comprises managing the security posture of an industrial control system device.

20. The computer-readable storage device of claim 16, wherein the method further comprises refreshing the ontology graph.

* * * * *